United States Patent
Maldaner

(10) Patent No.: US 9,485,244 B2
(45) Date of Patent: Nov. 1, 2016

(54) EXECUTING AN OPERATION OVER FILE REPOSITORIES LOCATED IN DIFFERENT AUTHENTICATION DOMAINS USING A REPRESENTATIONAL STATE TRANSFER (REST)-COMPLIANT CLIENT

(71) Applicant: Citrix Systems, Inc., Fort Lauderdale, FL (US)

(72) Inventor: Juliano Maldaner, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/635,663

(22) Filed: Mar. 2, 2015

(65) Prior Publication Data

US 2016/0261575 A1 Sep. 8, 2016

(51) Int. Cl.
*G06F 21/45* (2013.01)
*H04L 29/06* (2006.01)
*H04L 29/08* (2006.01)
*G06F 17/30* (2006.01)
*H04L 12/715* (2013.01)

(52) U.S. Cl.
CPC ......... *H04L 63/08* (2013.01); *G06F 17/30867* (2013.01); *H04L 63/10* (2013.01); *H04L 67/02* (2013.01)

(58) Field of Classification Search
CPC ............................ H04L 63/0815; H04L 21/45
See application file for complete search history.

(56) References Cited

U.S. PATENT DOCUMENTS

| | | | |
|---|---|---|---|
| 2006/0075405 A1* | 4/2006 | Sinha | G06F 9/5033 718/100 |
| 2009/0132713 A1 | 5/2009 | Dutta et al. | |
| 2010/0268932 A1* | 10/2010 | Bhattacharjee | H04L 63/0281 713/151 |
| 2011/0040749 A1 | 2/2011 | Ceri et al. | |
| 2011/0041171 A1 | 2/2011 | Burch et al. | |
| 2014/0123264 A1* | 5/2014 | Shull | H04L 63/08 726/7 |
| 2014/0230027 A1* | 8/2014 | Cha | H04L 63/0815 726/5 |
| 2014/0289838 A1 | 9/2014 | Gupta et al. | |

FOREIGN PATENT DOCUMENTS

WO 0239237 A2 5/2002

OTHER PUBLICATIONS

Enhancing Security in Cloud Computing. Mukundrao et al. Information and Knowledge Management(2011).*
CN103188344A(English Translation). Shuai et al. SIPO. Jul. 3, 2013.*
Cesare Pautasso, et al.; "Restful Web Services vs. "Big" Web Services: Making the Right Architectural Decision"; International World Wide Web Conference Committee (IW3C2); WWW 2008; Apr. 21-25, 2008; Beijing, China; 10 pages.
International Search Report and the Written Opinion of the International Searching Authority for International Application No. PCT/US2016/019822, mailed from the European Patent Office on May 3, 2016, 11 pages.

* cited by examiner

*Primary Examiner* — Venkat Perungavoor
(74) *Attorney, Agent, or Firm* — BainwoodHuang

(57) ABSTRACT

An initial server, located in an initial authentication domain, receives a requested operation from a RESTful client system, and generates a redirections list having entries indicating servers located in authentication domains other than the initial domain. The initial server transmits the redirections list back to the client system. The redirections list instructs the client system to perform a command on each of the servers indicated in the redirections list, and may optionally be transmitted with a partial result from the initial server. The client system verifies that partial results in responses from servers in the other authentication domains and from the initial server are of an appropriate result type and number, and then aggregates all the partial results received from all authentication domains into a single final result, which may be displayed to a user of the client system.

17 Claims, 7 Drawing Sheets

EXECUTING AN OPERATION OVER FILE REPOSITORIES LOCATED IN DIFFERENT AUTHENTICATION DOMAINS USING A REPRESENTATIONAL STATE TRANSFER (REST)-COMPLIANT CLIENT

BACKGROUND

An authentication domain (also referred to herein simply as a "domain") is a set of resources that requires a requesting entity to be authenticated prior to gaining access to resources stored securely within the domain. For example, an authentication domain may consist of information technology (IT) resources (e.g. data, server computer systems, software services, etc.) belonging to a business organization, and require that employees of the organization first be authenticated (e.g. by logging on with their user name and password or in some other fashion), prior to being given access to any of the domain's secure resources.

Authentication domains are typically separate and independent. Accordingly, if a user is able to access multiple authentication domains, they must authenticate to each one of the authentication domains through a separate transaction or process. Additionally, different credentials and/or processes may be needed to authenticate a user or users to different authentication domains.

SUMMARY

Previous systems for performing operations across different authentication domains have had significant drawbacks. Specifically, problems have arisen when previous systems have allowed a server to authenticate to various different domains on behalf of a client. Such authentication has been accomplished by use of a super-user account, or by caching the client's authentication materials within the server. With these systems, when the client performs a search operation, the central server acts on the client's behalf to access data that is securely stored in the different authentication domains, based on the privileges provided by the super-user account, or by acting as the client using the cached authentication materials. In this type of solution, the central server has full visibility into the securely stored data. Such data visibility provided to an entity outside of the secure domains is unacceptable in many contexts. In particular, exposing a customer's secure data to a third party (e.g. the central server acting on behalf of the client) is contrary to data privacy protection requirements that many Software as a Service (SaaS) customers have. In order to meet these data privacy protection requirements, SaaS providers must have no ability to access customer data. Additionally, whenever a client authorizes a third party-server to act on the user's behalf, non-repudiation cannot be maintained, and there is accordingly no assurance that actions taken in the user's name were actually performed by the user.

Other drawbacks of previous systems relate to performing specific operations across different authentication domains. For example, existing search services typically operate by indexing information stored across the entire World Wide Web, and then respond to search queries based on the resulting index. However, these existing search systems cannot operate in the context of a specific user, and accordingly cannot access information that requires end-user authentication. Moreover, existing systems lack the ability to aggregate search results across multiple authentication domains. A user wishing to perform a search with respect to multiple domains must accordingly perform the search one domain at a time, issuing a separate search operation for each individual authentication domain to be searched.

In addition, some previous systems for performing copy operations across different domains have first downloaded the data from a source domain to the client, and then uploaded the data from the client to the target domain. This approach is not effective when the client is a mobile device, since a copy operation between servers that transfers large files through a mobile-device is impractical. This approach to multi-domain copying are is inconsistent with the goal of providing a "RESTful" client-server solution, i.e. one that conforms to the architectural principles of Representational State Transfer (REST), since it places the business logic for executing the operation predominantly in the client. In contrast, a RESTful-compliant solution should place the business logic for performing the operation predominantly within the server.

To address these and other shortcomings of previous systems, a new system for executing an operation over file repositories located in different authentication domains is disclosed. In the disclosed system, an initial Application Programming Interface (API) server, located in an initial authentication domain, receives a requested operation from a client system. The initial server detects that the operation is to be performed across multiple, different authentication domains. The initial server then generates a redirections list having entries indicating a number of API servers located in one or more authentication domains that are different from the initial authentication domain. The initial server stores the redirections list into a partial response, and transmits the partial response back to the client system. The partial response instructs the client system to perform a command on each of the API servers indicated by the entries in the redirections list. The initial API server may optionally include a partial result together with the redirections list that it transmits to the client system.

When the API servers indicated by the entries in the redirections list respond to the commands transmitted by the client system, the client system verifies that partial results contained in those responses are of a result type that is consistent with the requested operation. The client system also verifies that an appropriate number of non-null partial results are received. The client system then aggregates all the partial results it has received into a single final result, which may be displayed to a user of the client system in a user interface of the client system. The final result is of the result type returned for the requested operation, and may be a list, or a single item received from either the initial API server or one of the API servers indicated by the redirections list. Various specific operations may be provided using the disclosed system. Examples of such operations include, but are not limited to, cross-domain copy, multi-domain search, and/or multi-domain user activity reporting.

Advantageously, and in contrast to previous systems, only the client system can access the data retrieved as a result of the requested operation being performed over the different authentication domains. Since the retrieved data is transmitted directly from the authentication domains to the client system, the disclosed system improves over previous systems by avoiding exposure of customer data outside of the authenticated requesting client system, thus providing data privacy protection. In contrast to previous solutions, the disclosed system is accordingly appropriate for use in contexts that have data privacy protection requirements, such as many software as a service (SaaS) provider environments.

The disclosed system is also advantageous over previous systems in that it uses a Representational State Transfer (REST)-compliant client. To process the redirections list, the client need only use a series of asynchronously issued domain-specific operations, and the API servers indicated by the entries in the redirections list need only process the commands transmitted from the client system within their own authentication domains. In this way the disclosed system meets the REST objective of having a relatively light-weight client, thus conforming to the REST client-server architectural constraints.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

A new system for executing an operation over file repositories located in different authentication domains is disclosed. In the disclosed system, an initial Application Programming Interface (API) server, located in an initial authentication domain, receives a requested operation from a client system. The initial server detects that the operation is to be performed across multiple, different authentication domains. The initial server then generates a redirections list having entries indicating a number of API servers located in one or more authentication domains that are different from the initial authentication domain. The initial server transmits the redirections list to the client system, thus instructing the client system to perform a command on each of the API servers indicated by the entries in the redirections list. The initial server may optionally include a partial result together with the redirections list that it transmits to the client system.

The API servers indicated by the entries in the redirections list respond to the commands transmitted by the client system with partial results, and the client system aggregates all the partial results it receives into a single final result, which may be displayed to a user of the client system in a user interface of the client system.

Figure 1:
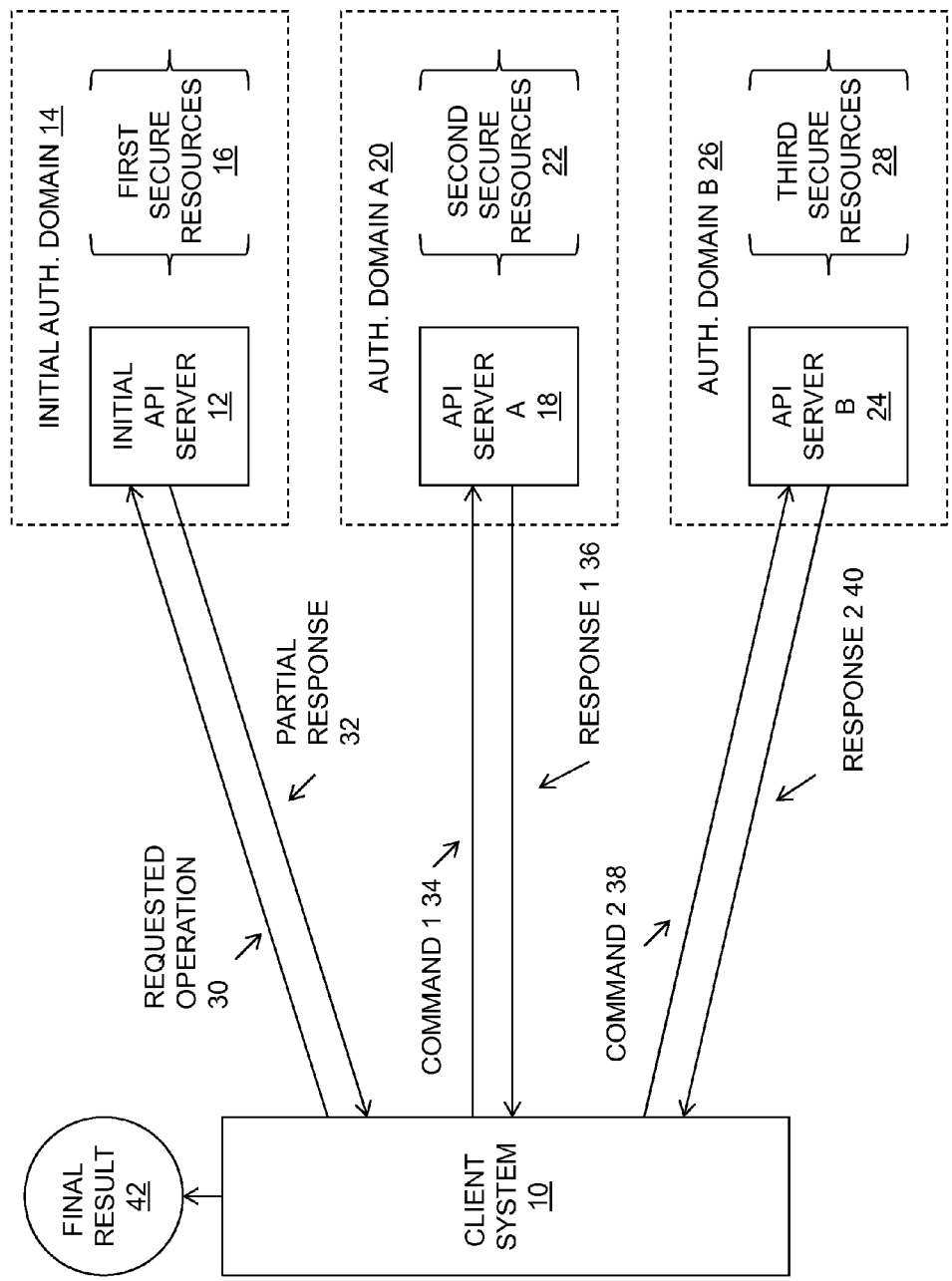
FIG. 1 is a block diagram showing components in an illustrative embodiment of the disclosed system.

FIG. 1 is a block diagram of components in an illustrative embodiment of the disclosed system. During operation of the components shown in FIG. 1, a Client System 10 transmits a Requested Operation 30 to an Initial Application Programming Interface (API) Server 12. The Initial API Server 12 is located in an Initial Authentication Domain 14. The Initial Authentication Domain 14 further includes First Secure Resources 16.

In response to receiving the Requested Operation 30, the Initial API Server 12 determines whether Client System 10 has been authenticated to Initial Authorization Domain 14. If not, then Initial API Server 12 will require Client System 10 to be authenticated, for example through a challenge-response authentication protocol that requires the user of Client System 10 to enter their username and password for Initial Authentication Domain 14, or through some other authentication process appropriate for the particular execution environment.

After Client System 10 has been authenticated to Initial Authentication Domain 14, the Initial API Server 12 parses the Requested Operation 30 to determine whether completing Requested Operation 30 requires resources from outside of Initial Authentication Domain 14 (i.e. resources other than First Secure Resources 16). If not, then Initial API Server 12 processes Requested Operation 30 within Initial Authentication Domain 14 using resources from First Secure Resources 16. Otherwise, in the case where Requested Operation 30 requires resources from one or more authentication domains other than Initial Authentication Domain 14, Initial API Server 12 generates a redirections list having entries indicating a number of API servers located in one or more authentication domains that are different from the Initial Authentication Domain 14. For example, in the case where Requested Operation 30 requires resources from Second Secure Resources 22 contained in Authentication Domain A 20, and from Third Secure Resources 28 contained in Authentication Domain B 26 contained in Authentication Domain B 26, Initial API Server 12 would generate a redirections list having a first entry indicating API Server A 18 in Authentication Domain A 20, and a second entry indicating API Server B 24 in Authentication Domain B 26.

The Initial API Server 12 then stores the redirections list into a Partial Response 32. The Initial API Server 12 may optionally include a partial result together with the generated redirections list in the Partial Response 32. For example, if the Requested Operation 30 is also applicable to one or more resources in First Secure Resources 16, then the Initial API Server 12 applies the Requested Operation 30 to First Secure Resources 16, and stores any results obtained from applying Requested Operation 30 to First Secure Resources 16 as a partial result within the Partial Response 30. If, alternatively, the Requested Operation 30 does not apply to resources in First Secure Resources 16, then Initial API Server 12 may set a partial result in Partial Response 32 equal to null, or omit the partial result entirely. The Initial API Server 12 then transmits the Partial Response 32 to the Client System 10.

Client System 10 receives the Partial Response 32, and the Partial Response 32 and/or the redirections list itself instructs Client System 10 to perform a command on each of the API servers indicated by an entry contained in the redirections list. Accordingly, Client System 10 generates and transmits Command 1 34 to API Server A 18 in Authentication Domain A 20. Command 1 34 is generated by Client System 10 based on information contained in an entry contained within the redirections list contained in the Partial Response 32. Command 1 34 is a domain-specific command, i.e. a command that can be completely performed within the Second Secure Resources 22. API Server A 18 receives Command 1 34, and first determines whether Client System 10 has been previously authenticated to Authentication Domain A 20. If not, then API Server A 18 requires Client System 10 to be authenticated to Authentication Domain A 20, for example through a challenge-response authentication protocol that requires the user of Client System 10 to enter their username and password for Authentication Domain A 20, or through some other authentication protocol appropriate for the particular execution environment.

After Client System 10 has been authenticated to Authentication Domain A 20, API Server A 18 generates a partial result by performing Command 1 34 on Second Secure Resources 22, and stores the partial result into Response 1 36. API Server A 18 then transmits Response 1 36 to Client System 10.

Further in the example of FIG. 1, Client System 10 generates and transmits Command 2 38 to API Server A 24 in Authentication Domain B 26. Command 2 38 is generated by Client System 10 based on information contained in another entry contained within the redirections list contained in the Partial Response 32. Command 2 38 may be transmitted by the Client System 10 asynchronously with respect to Command 1 34, in that Command 2 38 may be transmitted prior to any response being received with regard to Command 1 34. Command 2 38 is also a domain-specific command, i.e. a command that can be completely performed within the Third Secure Resources 28. Accordingly, API Server B 24 generates a partial result by performing Command 2 38 on Third Secure Resources 28, and stores the partial result into Response 2 40. API Server B 24 then transmits Response 2 40 to Client System 10.

The Client System 10 processes the responses received from Initial API Server 12 (i.e. Partial Response 32), API Server A 18 (i.e. Response 1 36), and API Server B 24 (i.e. Response 2 40) in part by verifying that the type of each received partial result matches a type expected to be returned for the Requested Operation 30. For example, if the expected type to be returned for the Request Operation 30 is a Feed of Items, then Client System 10 verifies that each partial result object contained in any of Partial Response 32, Response 1 36, or Response 2 40 is in fact a Feed of Items.

Similarly, Client System 10 may also process responses received from API Server 12, API Server A 18, and API Server B 24 by verifying that an appropriate number of partial results are received for the Requested Operation 30. For example, if the Requested Operation 30 only expects to receive a single element, then the Client System 10 verifies that only a single one of responses received from API Server 12, API Server A 18, and API Server B 24 includes any content. In other words, when the Requested Operation 30 expects only a single element response, the Client System 10 verifies that all of the responses except one have no content (e.g. have HTTP type 204—No Content). In the event that the type and total number of partial result objects received by the Client System 10 are verified, the Client System 10 aggregates all the received partial result objects into a single Final Result 42, which may be displayed to a user of the Client System 10, e.g. in a user interface of the Client System 10.

The Final Result 10 is of the result type returned for the requested operation, and may be a list of objects, or a single object received from either the initial API server or one of the API servers indicated by the redirections list. For example, in the case where the Request Operation 30 is a request to perform a search for files matching a search query in file repositories within First Secure Resources 16, Second Secure Resources 22 and Third Secure Resources 28 (i.e. a multi-domain search operation), each partial result received by the Client System 10 would consist of a list of files matching the search query in the respective set of secure resources. Specifically, Partial Response 32 would include a partial result object that is a list of all files within First Secure Resources 16 that match the search query, Response 1 36 would include a partial result object that is a list of all files within Second Secure Resources 22 that match the search query, and Response 2 40 would include a partial result object that is a list of all files within Third Secure Resources 28 that match the search query. The Client System 10 would then aggregate the received partial results into a single list of files matching the search query, for display to the user as Final Result 42.

In the case where the Request Operation 30 is a cross-domain copy operation, e.g. a request to copy a file from a first authentication domain (e.g. Authentication Domain A 20) to a second authentication domain (e.g. Authentication Domain B 26), only one partial result would be non-null, i.e. the partial result received in Response 2 40, which would contain the identifier of the file copy within the Third Secure Resources 28, and indicate that the copy operation was successful. Partial result aggregation by the Client System 10 would then consist of processing the single result object, e.g. reporting to the user through the user interface that the copy operation was successful by showing a visual representation of the new file copy in its new location within Third Secure Resources 28.

In another example, the Request Operation 30 may be a multi-domain user activity reporting request, such as a request for log data or the like describing a specified user's file-related activities performed in multiple authentication domains (e.g. in both Authentication Domain A 20 and Authentication Domain B 26). Such user activity data may be held privately by each authentication domain, and include information such as times, file names, and other details regarding operations performed by the specified user on files contained in each respective one of the multiple authentication domains, such as file access, file modify, file delete, etc. In this case, Response 1 36 would include a partial result containing user activity data describing the specified user's actions with regard to files contained in Second Secure Resources 22, and Response 2 40 would include a partial result containing user activity data describing the specified user's actions with regard to files contained in the Third Secure Resources 28. Partial result aggregation by the Client System 10 would then consist of combining the partial result data from Response 1 36 and Response 2 40 into Final Result 42, e.g. such that a report or the like is presented to the user of Client System 10 (e.g. through a graphical user interface of Client System 10) showing all the file-related activities of the specified user with regard to files contained in both Second Secure Resources 22 and Third Secure Resources 28.

While for purposes of concise illustration only three authentication domains are shown in FIG. 1, those skilled in the art will recognize that the disclosed system is not so limited. Accordingly, the disclosed system may be embodied and operated such that any specific number of different authentication domains are supported.

The Client System 10 and API Servers 12, 18 and 24 shown in FIG. 1 may, for example, each be embodied as or within one or more computer systems, each having processing circuitry (e.g. one or more processors), memory and/or other program storage, and one or more input/output interfaces. The operations described herein may be embodied in such computer systems using software, firmware, dedicated hardware circuitry, and/or some combination thereof. Similarly, those skilled in the art will recognize that one or more of the Client System 10 and API Servers 12, 18 and 24 shown in FIG. 1 may be embodied as, including, or within one or more virtual machines or the like.

Communication between the Client System 10 and the API Servers 12, 18 and 24 shown in FIG. 1 may be provided over one or more computer or other type of communication networks, such as, for example, one or more local area networks (LANs), wide area networks (WANs), and/or the Internet. Communication between the Client System 10 and the API Servers 12, 18 and 24 may use various specific communication protocols, including but not limited to the Hypertext Transfer Protocol (HTTP).

Figure 2:
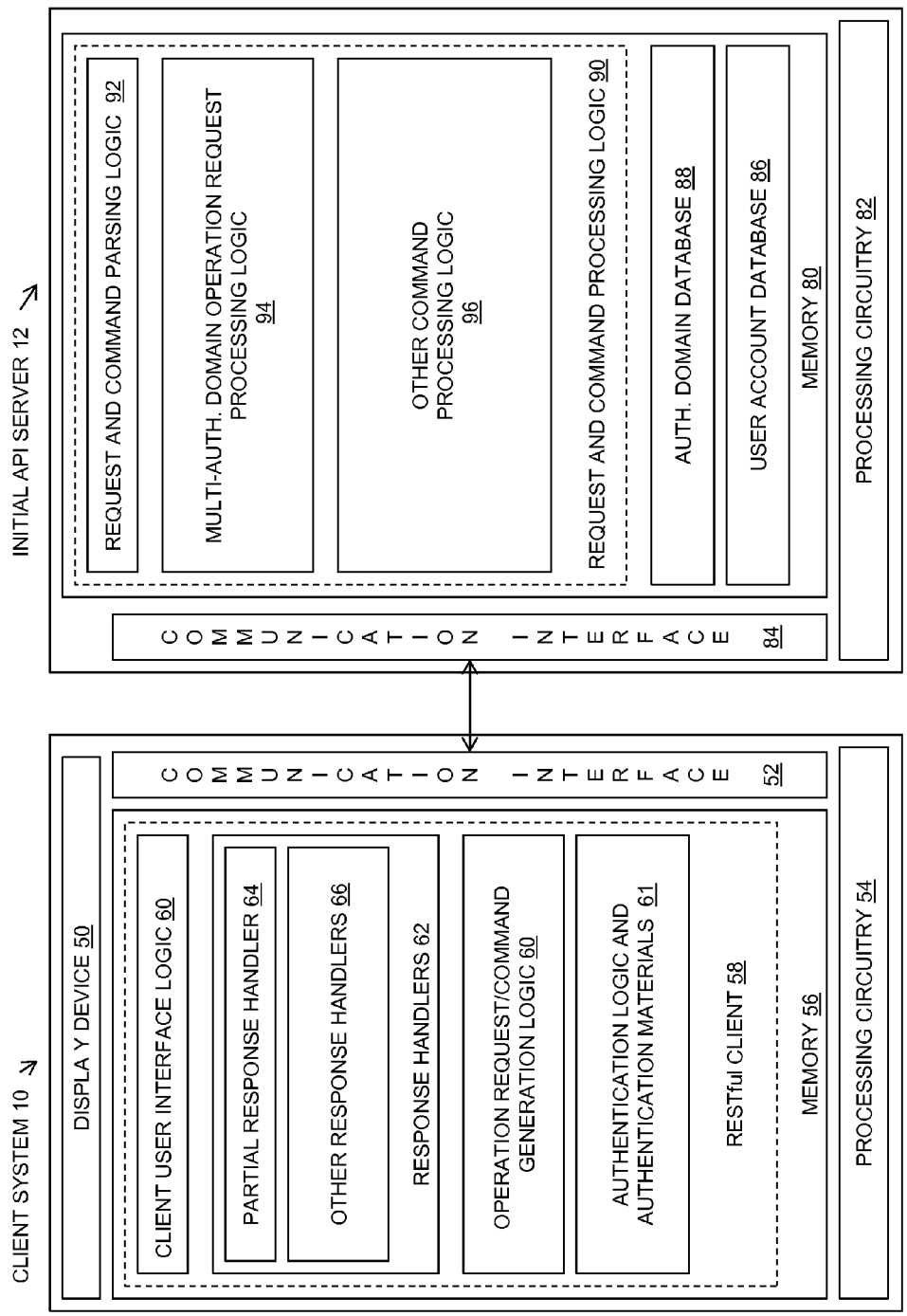
FIG. 2 is a block diagram showing the structure of a client system and an initial application programming interface (API) server in an illustrative embodiment of the disclosed system.

FIG. 2 is a block diagram showing the structure of a client system and an initial application programming interface (API) server in an illustrative embodiment of the disclosed system. As shown in the embodiment of FIG. 2, Client System 10 includes Display Device 50, Communication Interface 52, Processing Circuitry 54, and a program storage shown as Memory 56. Display Device 50 may include or consist of any specific type of output device operable to present information in visual form. Communication Interface 52 may, for example, include or consist of one or more network interface cards (NICs) or the like. Processing Circuitry 54 may, for example, include or consist of one or more microprocessors or the like. Memory 56 may, for example, include or consist of any specific type of volatile or non-volatile semiconductor memory or the like that is operable to store programs (sequences of instructions) and/or data (e.g. program state information) for use in the Client System 10.

The Memory 56 stores program logic for execution on the Processing Circuitry 54. In the embodiment of FIG. 2, Memory 56 includes REST compliant client application software, shown as RESTful Client 58. RESTful Client 58 includes Client User Interface Logic 60 for providing at least a portion of a graphical user interface to a user of Client System 10 within the Display Device 50. Authentication Logic and Authentication Materials 61 includes program code and/or authentication material for authenticating Client System 10 to various different authentication domains, e.g. through API servers located in the authentication domains. For example, Authentication Logic and Authentication Materials 61 may include authentication materials such as one or more "authentication cookies" containing evidence that Client System 10 has been previously authenticated to one or more of the different authentication domains contacted while processing a redirections list. Accordingly, such an "authentication cookie" may be used by Client System 10 to prove that Client System 10 has previously been authenticated to an authentication domain when communicating with an API server for that authentication domain while processing the redirections list. Authentication Logic and Authentication Materials 61 may also or alternatively include program code and/or authentication credentials for authenticating Client System 10 to one or more of the different authentication domains contacted while processing the redirections list, for example using one or more authentication protocols, such as, for example, the LAN Manager, NT LAN Manager (NTLM), Kerberos, or any other specific authentication protocol.

Operation Request/Command Generation Logic 60 includes program code for generating requested operations and/or commands, including the Requested Operation 30, Command 1 34 and Command 2 38 shown in FIG. 1, and for transmitting such operations and/or commands using the Communication Interface 52. Response Handlers 66 includes a number of response handler program code modules, which are responsible for handling messages (e.g. responses) received by Client System 10 for the RESTful Client 58 through the Communication Interface 52. Accordingly, when the Client System 10 receives a response for RESTful Client 58 (e.g. one of Partial Response 32, Response 1 36, or Response 2 40 shown in FIG. 1), RESTful Client 58 determines whether the response is a partial response, or some other type of response. In the case where the received response is a partial response, the received response is passed to the Partial Response Handler 64 for processing. Other responses received by Client System 10 for RESTful Client 58 are processed by the Other Response Handlers 66.

Further in the illustrative embodiment of FIG. 2, Initial API Server 12 includes Communication Interface 84, Processing Circuitry 82, and program storage shown as Memory 80. Communication Interface 84 may, for example, include or consist of one or more network interface cards (NICs) or the like. Processing Circuitry 82 may, for example, include or consist of one or more microprocessors or the like. Memory 80 may, for example, include or consist of any specific type of volatile or non-volatile semiconductor memory or the like that is operable to store programs (sequences of instructions) and/or data (e.g. program state information) for use in the Initial API Server 12.

The Memory 80 shown in FIG. 2 stores program logic for execution on the Processing Circuitry 82, shown as the Request and Command Processing Logic 90, as well as an Authentication Domain Database 88 and a User Account Database 86. When a requested operation (e.g. Requested Operation 30 in FIG. 1) is received by the Initial API Server 12 through the Communication Interface 84, the request is passed to the Request and Command Parsing Logic 92. The Request and Command Parsing Logic 92 determines whether executing the requested operation requires access to one or more resources located in one or more authentication domains other than the local authentication domain (e.g. other than the Initial Authentication Domain 14 in FIG. 1). If so, then the requested operation is passed to Multi-Authentication Domain Operation Request Processing Logic 94 for processing. Otherwise, in the case where the received requested operation can be completely executed using resources contained within the local authentication domain (e.g. contained within Initial Authentication Domain in FIG. 1), then the requested operation is passed to Other Command Processing Logic 96.

For example, the Request and Command Parsing Logic 92 may examine the contents of a received requested operation to determine if the received requested operation contains any indications of resources contained outside the local authentication domain. Such indications may, for example, include one or more paths specifying one or more files or file locations within one or more file repositories located in authentication domains other than the local authentication domain. If the received requested operation includes any indications of resources contained outside the local authentication domain, then the received requested operation is passed to Multi-Authentication Domain Operation Request Processing Logic 94 for processing.

In another example, the Request and Command Parsing Logic 92 may examine the contents of the User Account Database 86 to determine whether a user associated with the received requested operation has previously linked their account to one or more authentication domains other than the local authentication domain. References (names, paths, URLs, etc.) to such authentication domains previously linked to the user's account may, for example, be stored in an entry associated with the user and contained in the User Account Database 86. In the case where the received requested command indicates that the command should be executed across all authentication domains linked to the user's account, and where the user's account is linked to at least one authentication domain other than the local authentication domain, then the received requested operation is passed to the Multi-Authentication Domain Operation Request Processing Logic 94 for processing.

The Multi-Authentication Domain Operation Request Processing Logic 94 processes a requested operation by generating a partial response (e.g. Partial Response 32 in FIG. 1), and transmitting the partial response to the client system that transmitted the requested operation (e.g. Client System 10). The partial response generated by Multi-Authentication Domain Operation Request Processing Logic 94 includes a redirections list having entries indicating one or more other authentication domains to be contacted by the requesting client system in order to complete the requested operation. The contents of each entry in the redirections list includes information (e.g. a URL of an API server) indicating how an authentication domain is to be contacted by the client system. Such information indicating how a given authentication domain is to be contacted may be obtained by the Multi-Authentication Domain Operation Request Processing Logic 94 from the Authentication Domain Database 88. The Authentication Domain Database 88 includes information describing one or more different authentication domains other than the local authentication domain. Such information may, for example, include information describing how each authentication domain is to contacted by client systems such as the Client System 10. Information describing how a given authentication domain is to be contacted by a client system may, for example, include a URL of an API server within the authentication domain, and that is responsible for receiving commands from client systems.

Multi-Authentication Domain Operation Request Processing Logic 94 may optionally also operate to process a requested operation by generating a partial result to be included in the partial response. The partial result may, for example, include results obtained by performing the requested operation on resources contained within the local authentication domain.

Figure 3:
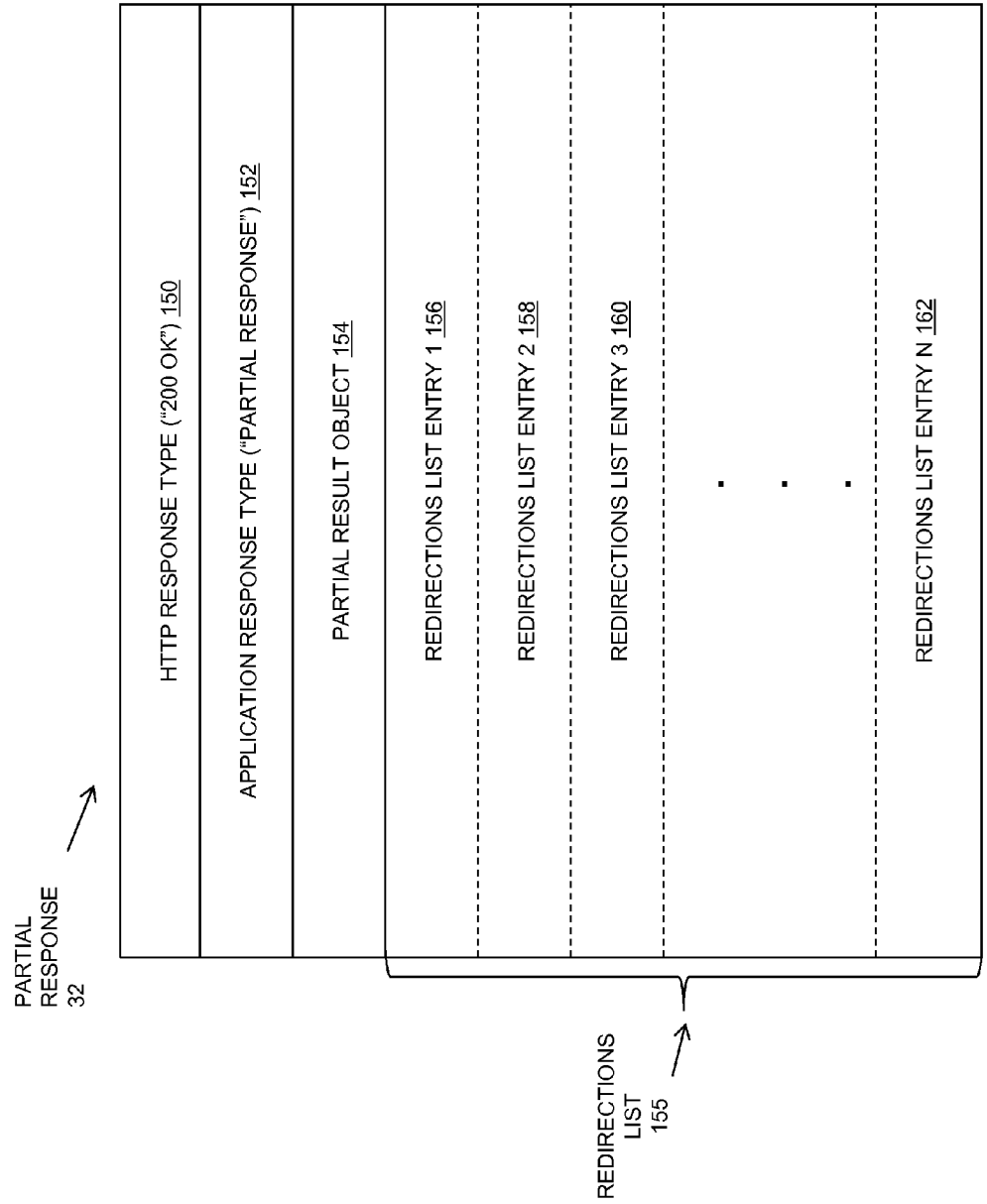
FIG. 3 is a block diagram showing an example of at least a portion of the structure of a partial response generated by and transmitted from an initial application programming interface (API) server in an illustrative embodiment of the disclosed system.

FIG. 3 is a block diagram showing an example of at least a portion of the structure of a partial response generated by and transmitted from an initial application programming interface (API) server in an illustrative embodiment of the disclosed system. As shown in FIG. 3, Partial Response 32 includes an HTTP Response Type 150, Application Response Type 152, a Partial Result Object 154, and a Redirections List 155 consisting of a number of list entries shown for purposes of illustration as Redirections List Entry 1 156, Redirections List Entry 2 158, Redirections List Entry 3 160, through Redirections List Entry N 162. The contents of the HTTP response type, may for example, include an HTTP response status code, such as HTTP response status 200. The contents of Application Response Type 152 may, for example, include a code or value indicating that the type of the response with regard to the RESTful Client 58 (FIG. 2) is "partial response", thus causing RESTful Client 58 to direct the response to the Partial Response Handler 64. The Partial Result Object 154 is optional, and, if present may, for example, include results of applying the requested operation to one or more resources located in the same authentication domain in which the initial API server is located.

Each entry in the Redirect List 156 indicates how the client is to contact one of the other authentication domains that must be contacted by the client in order to complete the requested operation.

Figure 4:
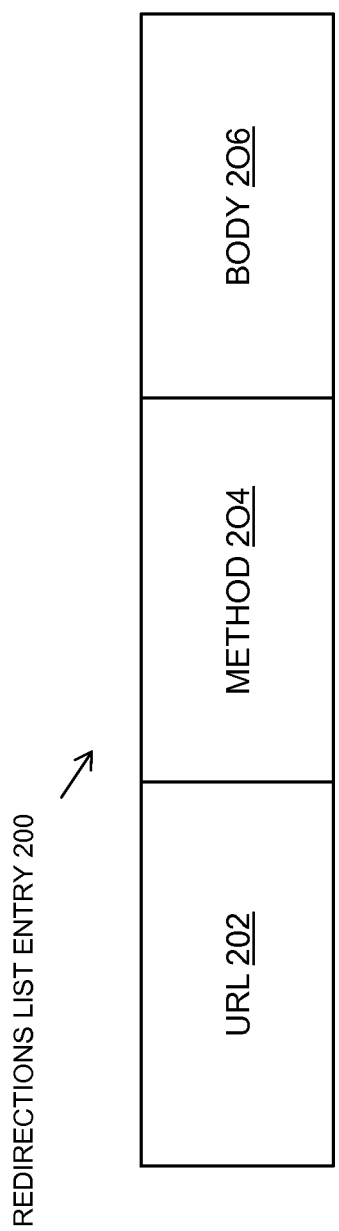
FIG. 4 is a block diagram showing an example of the structure of a redirections list entry in an illustrative embodiment of the disclosed system.

As shown by the example Redirections List Entry 200 of FIG. 4, a redirections list entry includes a URL 202, a Method 204, and a Body 206. The URL 202 is a Web address of an API server located in the authentication domain for the Redirections List Entry 200, and is to be used by the client when the client contacts the authentication domain. The Method 204 is, for example, an HTTP request method (e.g. GET, POST, etc.) that is to be used by the client when the client contacts the authentication domain. And Body 206, for example, includes other information, e.g. a JavaScript Object Notation (JSON) document, that is to be included with the request sent by the client system to the API server indicated by the URL 202.

Figure 5:
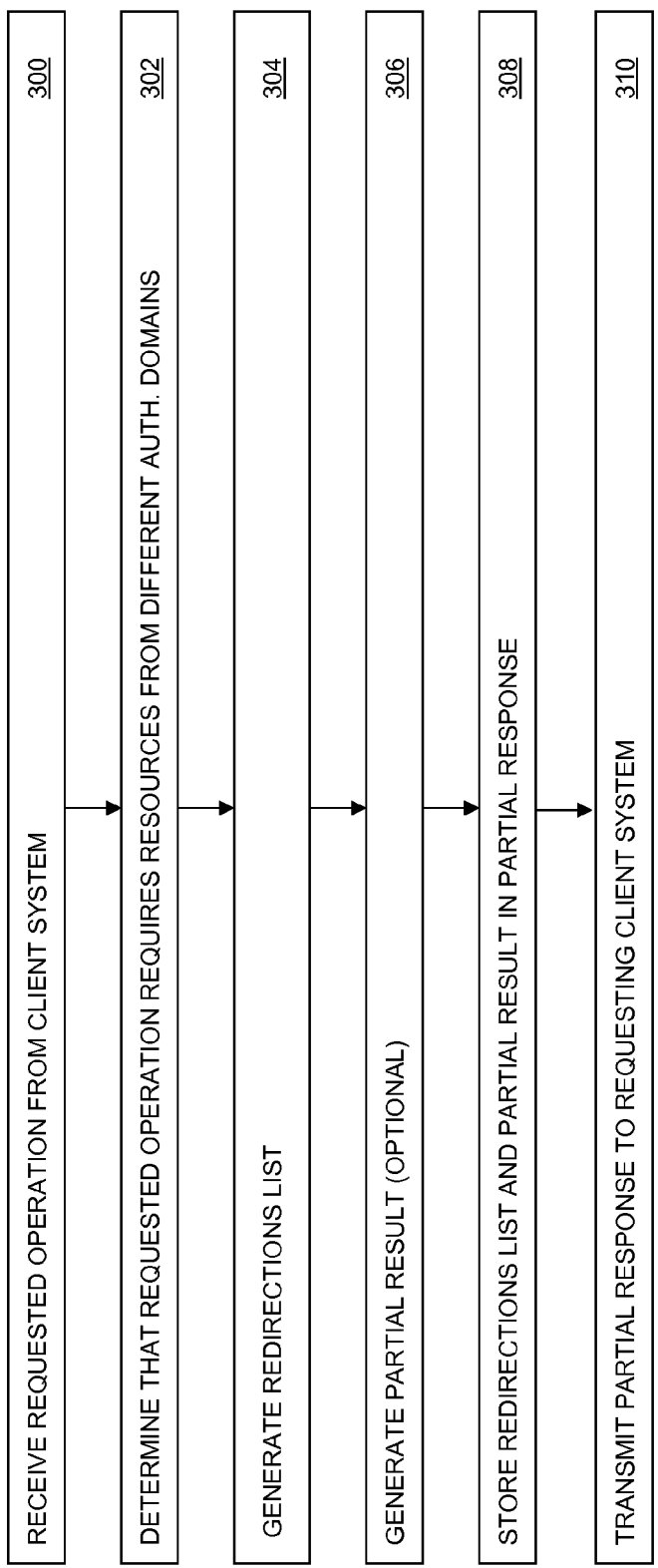
FIG. 5 is a flow diagram showing an example of steps performed by an initial application programming interface (API) server to process a request for an operation across different authentication domains in an illustrative embodiment of the disclosed system.

FIG. 5 is a flow diagram showing an example of steps performed by an initial API server to process a request for an operation across different authentication domains in an illustrative embodiment. The steps shown in FIG. 5 may, for example, be performed by the Initial API Server 12 (the "initial server") shown in FIG. 1 and FIG. 2. At step 300, the initial server receives a requested operation from the client system. The operation received at step 300 may be any specific multi-domain operation, such as, for example, a cross-domain copy, multi-domain search, or multi-domain user activity report request. At step 302, the initial server parses the requested operation, and determines that completion of the operation requires at least one resource from an authentication domain other than the local authentication domain. For example, the initial server may parse the requested operation and determine that it includes one or more paths indicating file locations in file repositories located outside the local authentication domain. In response to determining that completion of the operation requires resources from one or more authentication domains other than the local authentication domain, at step 304 the initial server generates a redirections list. The redirections list generated at step 304 includes a list entry for each of the authentication domains that the client must contact in order to complete the requested operation. For example, in the case of a cross-domain copy, the redirections list would include i) a first entry indicating the API server in the source authentication domain in which the file to be copied is currently located, ii) a second entry indicating the API server in the target authentication domain to which the file is to be copied, and iii) a third entry indicating an API server that is to be commanded by the client to copy the file from its current location in the source authentication domain to a location in the target authentication domain, where the transferring API server may be located in either the source, target, or some other authentication domain.

In another example, in the case of a multi-domain search, the redirections list would include an entry for each different authentication domain that is to be searched for files matching the search query indicated in the originally requested operation. And in a further example, in the case of a multi-domain user activity report request, the redirections list would include an entry for each different authentication domain from which is to be obtained file activity information regarding a specified user.

At step 306, the initial server optionally generates a partial result object by applying the requested operation to resources contained in the local authentication domain. For example, in the case of a multi-domain search, the initial server may create a partial result object that is a list of all files located within the local authentication domain that match the search query from the original requested operation.

At step 308, the initial server may store the redirections list and any partial result object into a partial response, for transmission from the initial server to the client system at step 310.

Figure 6:
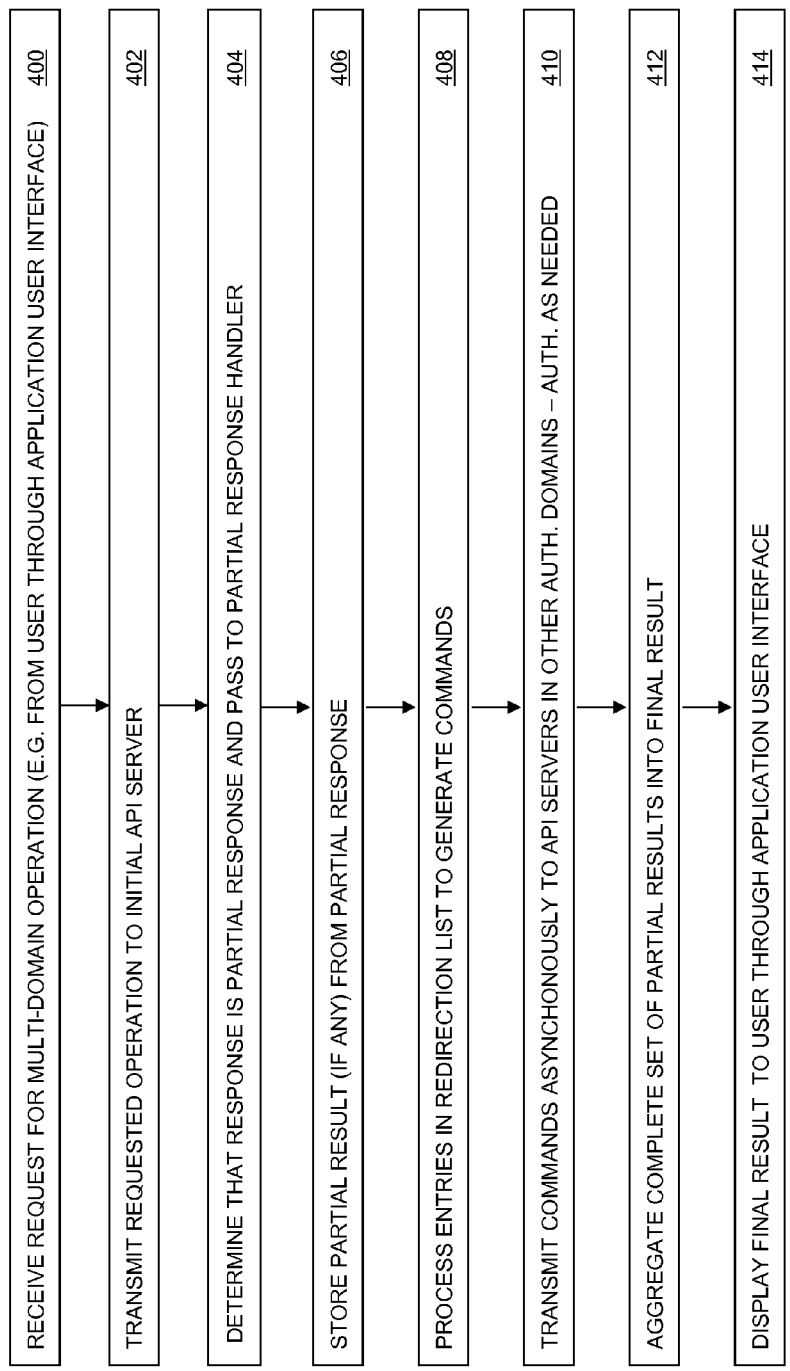
FIG. 6 is a flow diagram showing an example of steps performed by a RESTful client system to execute an operation across different authentication domains in an illustrative embodiment of the disclosed system.

FIG. 6 is a flow diagram showing an example of steps performed by a RESTful client system to perform an operation across different authentication domains in an illustrative embodiment of the disclosed system. The steps shown in FIG. 6 may, for example, be performed by the Client System 10 (the "client system") shown in FIG. 1 and FIG. 2. At step 400, the client system receives a request for a multi-domain operation. For example, the client system may receive at step 400 an indication of user actions performed on a graphical user interface generated by the client system. The user actions performed on the graphical user interface may indicate i) a type of operation to be requested (e.g. search, copy, request user activity report, etc.), and ii) a number of authentication domains on which the operation is to be performed (e.g. domains to be searched in a multi-domain search, source and target domains for a cross-domain copy, domains from which activities are to be obtained for a multi-domain user activity report request, etc.). In response to the request received at step 400, the client system generates a requested operation. Indications, such as a path or the like, that identify authentication domains on which the operation is to be performed, are stored by the client system into the requested operation when the client system generates the requested operation. Alternatively, in the case of a requested operation that is to be performed across all authentication domains that have previously been linked to the user's account, the client system includes an indication that the requested operation is to be performed across all authentication domains linked to the user's account within the requested operation when the client system generates the requested operation. The client system then transmits the requested operation to an initial API server at step 402.

The client system receives a response from the API server, and at step 404 determines that the response is a partial response, and passes the partial response to the partial response handler (e.g. Partial Response Handler 64 in FIG. 2). If the partial response includes a partial result object, the client system stores the partial result object from the partial response at step 406. Any partial result object included with redirections list must have a type that is the same as the documented response type of the requested operation. For example, if the requested operation returns a Feed of Items, then any partial result transmitted from the initial API server to the client system must be a Feed of Items. In one embodiment, if the initial API server does not have a partial result to send to the client system, the initial API server sends a partial result having a value of null to the client system.

At step 408, the client system processes the redirections list. At 410, in response to processing the redirections list, for each entry in the redirections list, the client system creates and transmits a command to an API server in an authentication domain other than the authentication domain containing the initial API server that generated the partial response. The commands transmitted at step 410 may be transmitted asynchronously, in that each command may be transmitted prior to any response being received for any one of the commands that was previously transmitted. Each of the commands transmitted at step 410 may result in the client system having to be authenticated to the authentication domain to which the command was transmitted. For example, one or more of the commands transmitted at step 410 may result in the destination API server performing a challenge-response authentication protocol with the client system. In such a case, the API server may present a question ("challenge") and the client system must provide a valid answer ("response") in order to be authenticated to the authentication domain containing the API server. The challenge-response protocol may, for example, require password authentication, in which case the client system may provide a valid response consisting of the password of the user of the client system. Other types of authentication protocols may be performed to authenticate the client system to each authentication domain indicated by the entries in the redirections list. Alternatively, if the client system has previously authenticated to an authentication domain indicated by an entry in the redirections list, the client system may provide proof of that previous authentication to the API server contained in the authentication domain, e.g. in the form of authentication materials previously stored in the client system, such as an authentication cookie or the like.

At step 412, the client system aggregates the results received from the initial API server and in the responses to the commands issued at step 410 into a single final result. For example, in the case where the requested operation returns a "feed", then all partial results in the partial response and/or responses to the commands issued at step 410 must be feeds of the same type, and the client system aggregates all received partial results by concatenating them into a single list that is the final result. In another example, in the case where the requested operation returns a single element response, then only the partial response or one of the responses to the commands issued at step 410 includes a partial result, and all other ones of the responses to the commands issued at step 410 have a status code of 204—No Content. The client system then displays the final result to the user of the client system through the graphical user interface of the application at step 414.

Figure 7:
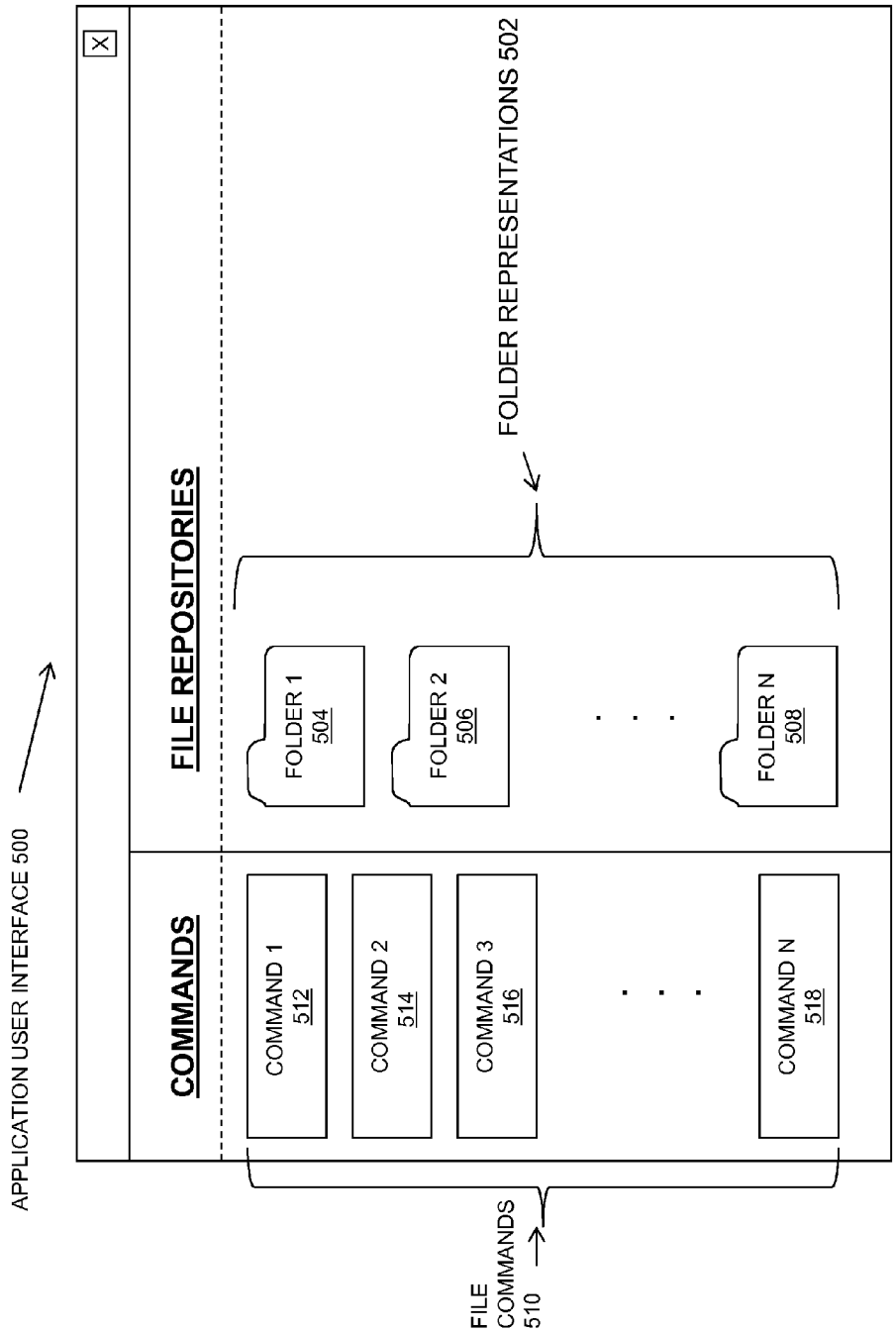
FIG. 7 is a simplified screenshot showing features in a portion of a graphical user interface generated by an illustrative embodiment of the disclosed system, enabling a user to specify an operation to be performed across different authentication domains.

FIG. 7 is a simplified screenshot showing features in a portion of a graphical user interface generated by an illustrative embodiment of the disclosed system, enabling a user to specify an operation to be performed across different authentication domains. The Application User Interface 500 shown in FIG. 7 may, for example, be displayed to a user of Client System 10 (FIG. 1 and FIG. 2), by Client User Interface Logic 60 through the Display Device 50. As shown in FIG. 7, an Application User Interface 500 includes Folder Representations 502, including Folder 1 504, Folder 2, 506, through Folder N 508. Each of the Folder Representations 502 may represent a file repository (e.g. a file server system or a file sharing service) located in a different authentication domain. For example, with reference to FIG. 1, Folder 1 504 may represent a file repository located in Authentication Domain A 20, and Folder 2 506 may represent a file repository located in Authentication Domain B 26. A user of Client System 10 may accordingly select the file repository located in Authentication Domain A 20 by selecting (e.g. clicking on) Folder 1 504, and/or may select the file repository located in Authentication Domain B 26 by selecting (e.g. clicking on) Folder 2 506. Similarly, the user of Client System 10 may browse and select from the files contained in the file repository contained in Authentication Domain A 20 by double clicking on Folder 1 504, and may browse and select from the files contained in the file repository contained in Authentication Domain B 26 by double clicking on Folder 2 506.

File Commands 510 are shown including Command 1 512, Command 2 514, Command 3 516 through Command N 518. File Commands 510 are examples of user interface display objects (e.g. buttons) that a user can select in order to indicate a specific requested operation to be performed with respect to one or more currently selected files, file repositories, etc. For example, clicking on Command 1 512 may trigger a search operation with respect to one or more currently selected file repositories. Accordingly, if the user clicks on Command 1 512 after selecting Folder 1 504 and Folder 2 506, a multi-domain search operation would be initiated to search the file repository in Authentication Domain A 20 and the file repository in Authentication Domain B 26 for files matching a search term. Such a requested operation would include paths indicating Authentication Domain A 20 and Authentication Domain B 26.

Alternatively, clicking on Command 1 512 may trigger a search operation with respect to all file repositories located in all authentication domains that have previously been linked to an account associated with a user of Client System 10. In that case, the requested operation would be generated to include an indication that a search operation is to be performed across all file repositories in all authentication domains that have previously been linked to an account associated with the user.

In another example, clicking on Command 2 514 may trigger a copy operation that copies a currently selected file to a subsequently selected target file location or repository. Accordingly, if the user selects a file contained in the file repository located in Authentication Domain A 20 while browsing within Folder 1 504, then clicks on Command 2 514, and then indicates that the file repository within Authentication Domain B 26 is the target for the copy, a cross-domain copy operation would be initiated to copy the selected file from the file repository located in Authentication Domain A 20 to the file repository located in Authentication Domain B 26.

And in another example, clicking on Command 3 516 may trigger a user activity report request with regard to a previously indicated user across one or more currently selected file repositories. Accordingly, if the user clicks on Command 3 516 while Folder 1 504 and Folder 2 506 are selected, a multi-domain user activity report request would be initiated that collects log data describing all file operations performed by the previously indicated user across both the file repository located in Authentication Domain A 20 and the file repository located in Authentication Domain B 26. Alternatively, clicking on Command 3 516 may trigger a user activity report request with regard to a previously indicated user across all file repositories located in all authentication domains previously linked to an account associated with the user of Client System 10.

Those skilled in the art will recognize that the specific user interface objects shown in FIG. 7 (i.e. buttons) are provided only for purposes of convenient illustration and explanation, and that the disclosed system is not limited embodiments using those specific user interface objects to provide user access to multi-domain operations supported by the disclosed system. Any appropriate type of graphical control element (e.g. drop-down menus, pop-up menus, context menus, sub-menus, etc.) may be used as a functional alternative to the buttons shown in File Commands 510 or the folders shown in Folder Representations 502. Moreover, the Application User Interface 500 itself is shown in a simplified representation, and various user interface display objects other than the ones shown may be included or added as needed for a specific embodiment.

Thus there is disclosed a new system for executing an operation, having specific features that enable the operation to be performed over multiple file repositories located in different authentication domains, while providing significant improvements over previous systems. The disclosed system provides specific improvements over previous solutions, including effectively executing a requested operation over the different authentication domains while only allowing the client system to access data retrieved the different domains as a result of executing the operation on the different domains. Since the retrieved data is transmitted directly from the respective authentication domains to the client system, the disclosed system improves over previous systems by avoiding exposure of any customer data outside of an authenticated, requesting client system, thus providing data privacy protection. In contrast to previous solutions, the disclosed system is accordingly appropriate for use in contexts that have data privacy protection requirements, such as many software as a service (SaaS) provider environments.

The disclosed system also improves over previous systems by using a Representational State Transfer (REST)-compliant client. To process the redirections list generated by the disclosed system, the client advantageously need only use a series of asynchronously issued domain-specific operations, and the API servers indicated by the entries in the redirections list need only process the commands transmitted from the client system within their own authentication domains. In this way the disclosed system meets the desired REST objective of having a relatively light-weight client, thus conforming to the REST client-server architectural constraints.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable storage medium(s) having computer readable program code embodied thereon.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD- ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The disclosed system can take the form of an entirely software-based embodiment, an entirely hardware-based embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of executing an operation across different authentication domains, comprising:
  receiving, by an initial server system located in an initial authentication domain, a requested operation transmitted in a message from a client system, wherein the requested operation comprises a search operation including at least one search query;
  in response to determining, by the initial server system, that the requested operation requires at least one resource located in an authentication domain other than the initial authentication domain, creating, by the initial server system in a memory of the initial server system, a redirections list indicating one or more other authentication domains to be contacted by the client system in order to complete the requested operation;
  transmitting the redirections list from the initial server system to the client system, the redirections list instructing the client system to contact the other authentication domains indicated in the redirections list in order to complete the requested operation;
  receiving, by the client system, partial results from the other authentication domains, wherein each partial result received from a respective one of the other authentication domains comprises at least one result obtained by applying the requested operation to at least one resource contained in that authentication domain, and wherein each of the received partial results from the other authentication domains comprises a list of documents stored in the other authentication domain that match the search query;
  aggregating, by the client system in response to the redirections list, the partial results received from the other authentication domains into a single final result, and wherein the client system aggregates the partial results by combining the lists of documents into a final list of documents that match the search query; and
  displaying, by the client system, the final result to a user of the client system.

2. The method of claim 1, wherein creating the redirections list includes creating a plurality of list entries, each of the list entries
  i) describing a corresponding one of the other authentication domains to be contacted by the client system, and
  ii) indicating how the corresponding one of the other authentication domains is to be contacted by the client system.

3. The method of claim 1, further comprising:
  wherein creating the redirections list includes creating a plurality of list entries, each of the list entries corresponding to one of the other authentication domains to be contacted by the client system;
  wherein each list entry includes
    i) a uniform resource locator (URL), wherein the URL indicates a server system in the corresponding one of the other authentication domains to be contacted by the client system,
    ii) a method, and
    iii) a body; and
  wherein the client system contacts the other authentication domains by, for each list entry, issuing a hyper-text transfer protocol (HTTP) request to the server system in the corresponding one of the other authentication domains, wherein the HTTP request includes the method, the URL and the body included in the list entry.

4. The method of claim 1, further comprising:
  generating, by the initial server system, a partial result by applying the requested operation to at least one resource contained in the initial authentication domain;
  transmitting, by the initial server system, the partial result to the client system;
  receiving, by the client system, the partial result from the initial server system; and
  wherein aggregating the partial results received from the other authentication domains into the single final result includes aggregating the partial result received from the initial server system together with the partial results received from the other authentication domains.

5. The method of claim 3, further comprising:
  receiving, by the client system from a user of the client system through a user interface of the client system, a selection of at least one resource that is located in an authentication domain other than the initial authentication domain;

storing, by the client system in the requested operation, an indication of the user selected resource that is located in the authentication domain other than the initial authentication domain;

wherein the determining, by the initial server system, that the requested operation requires at least one resource located in an authentication domain other than the initial authentication domain is in response to finding, in the requested operation, the indication of the user selected resource located in the authentication domain other than the initial authentication domain; and wherein creating the redirections list includes creating an entry in the redirections list corresponding to the authentication domain in which the user selected resource is located.

6. The method of claim 3, further comprising:

receiving, by the client system from a user of the client system through a user interface of the client system, an indication that the requested operation is to be performed across all resources in all authentication domains linked to an account of the user;

identifying, by the initial server system in response to account information stored on the initial server system, an authentication domain that has previously been linked to the account of the user, wherein the authentication domain that has previously been linked to the account of the user is other than the initial authentication domain;

wherein the determining, by the initial server system, that the requested operation requires at least one resource located in an authentication domain other than the initial authentication domain is in response to identifying the authentication domain that has previously been linked to the account of the user; and wherein creating the redirections list includes creating an entry in the redirections list corresponding to the authentication domain that has previously been linked to the account of the user.

7. The method of claim 1, further comprising:

wherein the initial server system further transmits a partial result to the client system, the partial result comprising a list of documents stored in the initial authentication domain that match the search query; and wherein the client system combines the partial result received from the initial server system with the partial results received from the other authentication domains into the final list of documents that match the search query.

8. A method of executing an operation across different authentication domains, comprising:

receiving, by an initial server system located in an initial authentication domain, a requested operation transmitted in a message from a client system;

in response to determining, by the initial server system, that the requested operation requires at least one resource located in an authentication domain other than the initial authentication domain, creating, by the initial server system in a memory of the initial server system, a redirections list indicating one or more other authentication domains to be contacted by the client system in order to complete the requested operation;

transmitting the redirections list from the initial server system to the client system, the redirections list instructing the client system to contact the other authentication domains indicated in the redirections list in order to complete the requested operation;

wherein the requested operation comprises a copy operation indicating that a file stored in a source file repository is to be copied to a target file repository, wherein the source file repository is located in a first one of the other authentication domains, and wherein the target file repository is located in a second one of the other authentication domains; and wherein creating the redirections list includes creating a first list entry storing a URL of a source server, the source server located in the first one of the other authentication domains, creating a second list entry storing a URL of a target server, the target server located in the second one of the other authentication domains, and creating a third list entry storing a URL of a transfer server, wherein the transfer server is responsible for copying the file from the source file repository to the target file repository.

9. The method of claim 5, further comprising:

wherein the user selected resource that is located in the authentication domain other than the initial authentication domain comprises a file repository; and wherein storing the indication of the user selected resource that is located in the authentication domain other than the initial authentication domain includes storing a path that points to the file repository in the requested operation.

10. A system for executing an operation across different authentication domains comprising:

an application programming interface (API) server, comprising processing circuitry and memory, coupled to the processing circuitry, the memory storing instructions which, when carried out by the processing circuitry, cause the API server to:

receive a requested operation transmitted in a message from a client system, wherein the requested operation comprises a search operation including at least one search query, determine that the requested operation requires at least one resource located in an authentication domain other than an initial authentication domain in which the API server is located, create, in the memory of the API server in response to the determination that the operation requires at least one resource located in an authentication domain other than the initial authentication domain, a redirections list indicating one or more other authentication domains to be contacted by the client system in order to complete the requested operation, transmit the redirections list from the API server system to the client system, the redirections list instructing the client system to contact the other authentication domains indicated in the redirections list in order to complete the requested operation; and wherein the client system comprises processing circuitry and memory coupled to the processing circuitry, the memory storing instructions which, when carried out by the processing circuitry, cause the client system to:

receive partial results from the other authentication domains, wherein each partial result received from a respective one of the other authentication domains comprises at least one result obtained by applying the requested operation to at least one resource contained in that authentication domain, and wherein each of the received partial results from the other authentication domains comprises a list of documents stored in the other authentication domain that match the search query,
aggregate the partial results received from the other authentication domains into a single final result, and wherein the client system aggregates the partial results by combining the lists of documents into a final list of documents that match the search query, and
display the final result to a user of the client system.

11. The system of claim 10, further comprising:
wherein the instructions stored in the API server memory, when carried out by the API server processing circuitry, cause the API server to create the redirections list by creating a plurality of list entries, each of the list entries
   i) describing a corresponding one of the other authentication domains to be contacted by the client system, and
   ii) indicating how the corresponding one of the other authentication domains is to be contacted by the client system.

12. The system of claim 10, further comprising:
wherein the instructions stored in the API server memory, when carried out by the API server processing circuitry, cause the API server to create the redirections list by creating a plurality of list entries, each of the list entries corresponding to one of the other authentication domains to be contacted by the client system;
wherein each list entry includes
   i) a uniform resource locator (URL), wherein the URL indicates a server system in the corresponding one of the other authentication domains to be contacted by the client system,
   ii) a method, and
   iii) a body; and
wherein the redirections list causes the client system to contact the other authentication domains by, for each list entry, issuing a hyper-text transfer protocol (HTTP) request to the server system in the corresponding one of the other authentication domains, wherein the HTTP request includes the method, the URL and the body included in the list entry.

13. The system of claim 10, further comprising:
wherein the instructions stored in the API server memory, when carried out by the API server processing circuitry, further cause the API server to
   generate a partial result by applying the requested operation to at least one resource contained in the initial authentication domain, and
   transmit the partial result to the client system; and
wherein the instructions stored in the client system memory, when carried out by the client system processing circuitry, further cause the client system to
   receive the partial result from the AP server, and
   aggregate the partial results received from the other authentication domains into the single final result by aggregating the partial result received from the AP server together with the partial results received from the other authentication domains.

14. The system of claim 12, further comprising:
wherein the instructions stored in the client system memory, when carried out by the client system processing circuitry, further cause the client system to
   receive, from a user of the client system through a user interface of the client system, a selection of at least one resource that is located in an authentication domain other than the initial authentication domain, and
   store, in the requested operation, an indication of the user selected resource that is located in the authentication domain other than the initial authentication domain; and
wherein the instructions stored in the API server memory, when carried out by the API server processing circuitry, further cause the API server to
   determine that the requested operation requires at least one resource located in an authentication domain other than the initial authentication domain by finding, in the requested operation, the indication of the user selected resource located in the authentication domain other than the initial authentication domain, and
   create the redirections list by at least creating an entry in the redirections list corresponding to the authentication domain in which the user selected resource is located.

15. A system for executing an operation across different authentication domains, comprising:
an application programming interface (API) server, comprising processing circuitry and memory, coupled to the processing circuitry, the memory storing instructions which, when carried out by the processing circuitry, cause the API server to:
   receive a requested operation transmitted in a message from a client system,
   determine that the requested operation requires at least one resource located in an authentication domain other than an initial authentication domain in which the API server is located,
   create, in the memory of the API server in response to the determination that the operation requires at least one resource located in an authentication domain other than the initial authentication domain, a redirections list indicating one or more other authentication domains to be contacted by the client system in order to complete the requested operation, and
   transmit the redirections list from the API server system to the client system, the redirections list instructing the client system to contact the other authentication domains indicated in the redirections list in order to complete the requested operation;
wherein the client system comprises processing circuitry and memory coupled to the processing circuitry, the memory storing instructions which, when carried out by the processing circuitry, cause the client system to
   receive, from a user of the client system through a user interface of the client system, an indication that the requested operation is to be performed across all resources in all authentication domains linked to an account of the user; and
wherein the instructions stored in the API server memory, when carried out by the API server processing circuitry, further cause the API server to
   identify, in response to account information stored on the initial server system, an authentication domain that has previously been linked to the account of the user, wherein the authentication domain that has previously been linked to the account of the user is other than the initial authentication domain, and
   determine that the requested operation requires at least one resource located in an authentication domain other than the initial authentication domain in response to identifying the authentication domain that has previously been linked to the account of the user, and create the redirections list by creating an entry in the redirections list corresponding to the authentication domain that has previously been linked to the account of the user.

16. The system of claim 14, further comprising:

wherein the user selected resource that is located in the authentication domain other than the initial authentication domain comprises a file repository; and wherein the instructions stored in the client system memory, when carried out by the client system processing circuitry, further cause the client system to store the indication of the user selected resource that is located in the authentication domain other than the initial authentication domain by storing a path that points to the file repository in the requested operation.

17. A computer program product, comprising:

a non-transitory computer readable medium which stores a set of instructions for executing an operation across different authentication domains, the set of instructions, when carried out by computer circuitry, causing the computer circuitry to perform a method of:

receiving, by an initial server system located in an initial authentication domain, a requested operation transmitted in a message from a client system, wherein the requested operation comprises a search operation including at least one search query;

in response to determining, by the initial server system, that the requested operation requires at least one resource located in an authentication domain other than the initial authentication domain, creating, by the initial server system in a memory of the initial server system, a redirections list indicating one or more other authentication domains to be contacted by the client system in order to complete the requested operation;

transmitting the redirections list from the initial server system to the client system, the redirections list instructing the client system to contact the other authentication domains indicated in the redirections list in order to complete the requested operation;

receiving, by the client system, partial results from the other authentication domains, wherein each partial result received from a respective one of the other authentication domains comprises at least one result obtained by applying the requested operation to at least one resource contained in that authentication domain, and wherein each of the received partial results from the other authentication domains comprises a list of documents stored in the other authentication domain that match the search query;

aggregating, by the client system in response to the redirections list, the partial results received from the other authentication domains into a single final result, and wherein the client system aggregates the partial results by combining the lists of documents into a final list of documents that match the search query; and displaying, by the client system, the final result to a user of the client system.

* * * * *